March 16, 1948.  J. C. NASH  2,437,967
TENTER MACHINE CLIP
Filed March 12, 1947
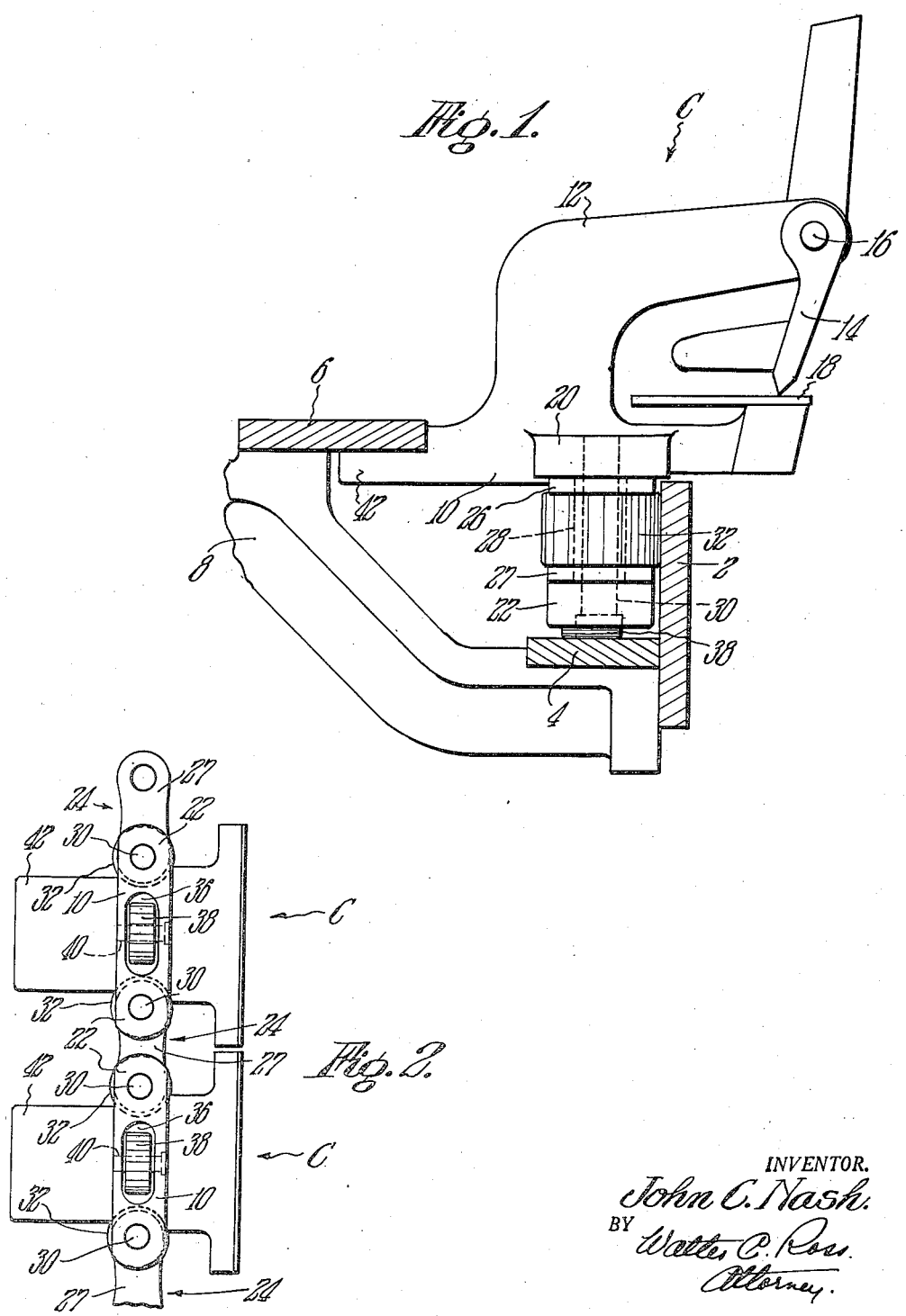
INVENTOR.
John C. Nash.
BY Walter C. Ross.
Attorney.

Patented Mar. 16, 1948

2,437,967

UNITED STATES PATENT OFFICE 2,437,967

TENTER MACHINE CLIP

John C. Nash, Providence, R. I.

Application March 12, 1947, Serial No. 734,066

6 Claims. (Cl. 26—61)

1

This invention relates to improvements in tenter apparatus and is directed more particularly to the tenter clips and chains formed thereby for tenter machines shown in U. S. Letters Patent No. 2,147,115 of February 14, 1939.

The principal objects of the invention are the provision of a tenter chain and clip therefor which are characterized by novel means to facilitate free movement of the chain relative to the supporting and guiding means therefor.

As in the patent referred to, a tenter machine includes two transversely spaced endless chains which pass around longitudinally spaced driving sprockets. The chains are formed by pivotally connected clips after the manner of links. The runs of the chains are supported and guided in rails and the inner and adjacent runs of the chains move longitudinally of the machine in one direction so as to engage and transport a web of cloth or the like along and through the machine. The clips of the chains are constructed and arranged to grip the web adjacent its edges for the transporting function.

The clips are quite heavy and the various industries employing tenter machines demand increasingly longer machines which results in increasingly longer and greater weights of chain. Also, tenter machines are being operated at increasingly faster speeds which require more power due to increase in friction.

The chains are supported and guided by rails or channels in such a way that the clips forming the chain are pulled therealong so as to result in a great amount of friction thereby requiring a great amount of driving power. In fact, the power consumed in moving the chains is considerably greater than that consumed by the other parts of the machine.

As an example, a machine having the chain sprockets ninety feet apart is not uncommon, and this requires two chains of at least one hundred-eighty feet each in length. A common form of tenter clip weighs approximately three and one-half pounds so that with approximately eleven hundred and sixty links in a chain of the length mentioned the weight of each chain would be approximately four thousand pounds. The weight therefor results not only in excessive power consumption but the links sliding along the rails as they do results in excessive wear of the parts all of which is objectionable.

In driving a tenter machine at usual speed where the sprockets are spaced apart as aforesaid and with the tenter chains removed about three horsepower is consumed. In driving the same

2 machine at the same speed but with the chains in operation and without cloth between them about twenty horsepower is consumed. This indicates a power consumption of at least seventeen horsepower consumed by the chains alone and is due to friction resulting from the chain dragging along the supporting and guiding rails. This horsepower is increased considerably, however, when opposite marginal edges of a web of material are engaged by the chains since the web is stretched transversely to some extent so that friction is increased by other portions of the clips which engage the guideways not engaged to any great extent in the absence of cloth.

According to this invention, a tenter clip and chain construction is provided which overcomes the objections of prior art constructions and is accomplished by the provision of means to facilitate free rolling of the chains along the supporting and guiding rails.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a side elevational view of a tenter clip embodying the novel features of the invention and shown in connection with rail forming members; and Fig. 2 is an inverted plan view at a reduced scale of a plurality of clips to explain the novel features of the invention.

Referring now to the drawings more in detail, the invention will be fully described.

A supporting and guiding rail is formed by outer vertical, lower horizontal, and inner horizontal longitudinally extending members 2, 4 and 6 which are secured to and supported by transverse members 8 spaced longitudinally of the machine as in the patent referred to. There will be rails for the inner adjacent and outer runs of the chains and obviously may be constructed in various ways, the rail construction shown being merely for illustrative purposes.

A clip C similar to that in the aforementioned patent includes a body 10 having outwardly extending spaced upper arms 12. A gate 14 is pivoted to the arms at 16 and is arranged to clamp an edge portion of a web of material to a plate 18 in the ordinary manner. The gate and plate form no part of the present invention and may take various forms as may be desired.

Vertically spaced upper and lower lugs or ears 20 and 22 extend outwardly from opposite ends of the body and are adapted to receive spaced links 24 therebetween.

Preferably the links include upper and lower plates 26 and 27 which are connected together and spaced apart at opposite ends by bushings 28. Pivot pins 30 extend through the lugs of the body and the bushings of the links whereby the links pivotally connect to the clips, as shown in Fig. 2. Rolls 32 are freely rotatable on the bushings 28.

The body of the clip at its lower side is provided with a socket 36 which is open at the lower side thereof and a roll 38 therein is freely rotatable on a pin 40. The periphery of the roll projects outwardly beyond the lower face of the clip body. A flange 42 extends rearwardly from the clip body, as shown in Fig. 1.

The parts are so constructed and arranged that the clip is supported from the rail horizontal member 4 by the roll 38 while the rolls 32 roll on the outer vertical member 2 and the flange 42 slides along beneath the horizontal rail member 6.

A sufficient number of clips C are connected together by the links 24, as shown in Fig. 2, to form a chain of the desired length. With the chain supported and guided in the rail, the chain is freely movable therealong. Each link is supported by the roll 38 and the chain is guided by the rolls 32 which are rollable along the rail member 2 and the flanges slidable beneath the rail member 6. In this way the clips are out of contact with the rail members, except for the flanges in contact with the rail member 6 all to the end the chain is freely movable along the rail structure thereby to greatly reduce wear of the parts and the power consumed in driving the chain.

The chain may be driven after the manner of the chain in the patent referred to or in any other manner desired.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent or the United States is:

1. A tenter clip comprising in combination, a body having a plate and a gate swingable relative thereto at the forward side thereof for clamping a web of material thereto, said body provided with a recess having an opening at the lower side of the body, a roll in said recess rotatable on a member therein and having a portion of its periphery extending below the lower face of the body for rolling along a lower horizontal portion of a rail below said clip and supporting said clip, upper and lower lugs extending outwardly from opposite ends of said body, links at opposite ends of the body having ends between said lugs, pivotal connections between the ends of said links and said lugs, and rolls between said ends of the links rotatable relative to said pivotal connections for rolling along a vertical portion of a rail at the forward side of said clip for guiding said clip.

2. A tenter clip comprising in combination, a body having a plate and a gate swingable relative thereto at the forward side thereof for clamping a web of material thereto, said body provided with a recess having an opening at the lower side of the body, a roll in said recess rotatable on a member therein and having a portion of its periphery extending below the lower horizontal face of the body for rolling along a lower portion of a rail below said clip and supporting said clip, upper and lower lugs extending outwardly from opposite ends of said body, links at opposite ends of the body having ends between said lugs, pivotal connections between the ends of said links and said lugs, rolls between said ends of the links rotatable relative to said pivotal connections for rolling along a vertical portion of a rail at the forward side of said clip for guiding said clip, and a flange extending from the rear side of said body for slidingly engaging a rear portion of a rail for guiding said clip.

3. A tenter chain comprising in combination, a plurality of successive tenter clips, each said clip provided with spaced upper and lower lugs extending from opposite ends thereof and having a roll journalled therein with a lower peripheral portion thereof extending below the lower face of the body for rollably supporting the clip from a lower horizontal portion of a rail, links having opposite ends between the adjacent upper and lower lugs of adjacent clips and pivotal connections between opposite ends of said links and lugs thereby swingably connecting adjacent clips, rolls rotatable relative to said pivotal connections for rolling along an outer vertical rail member to guide said chain, said links including upper and lower spaced plates and said rolls being disposed therebetween.

4. A tenter chain comprising in combination, a plurality of successive tenter clips, each said clip provided with spaced upper and lower lugs extending from opposite ends thereof and having a roll journalled therein with a lower peripheral portion thereof extending below the lower face of the body for rollably supporting the clip from a lower horizontal portion of a rail, links having opposite ends between the adjacent upper and lower lugs of adjacent clips and pivotal connections between opposite ends of said links and lugs disposed on vertical axes thereby swingably connecting adjacent clips, rolls rotatable relative to said pivotal connections for rolling along an outer vertical rail member to guide said chain, said links including upper and lower spaced plates and said rolls being disposed therebetween, and each said clip body having a rearwardly extending flange for slidably engaging an inner horizontal member of a rail cooperating with said roll to guide said chain along a rail.

5. A tenter clip adapted to be guided by a rail having forward vertical, lower intermediate horizontal and rear horizontal longitudinal portions comprising in combination, a body having a forward horizontal plate and a gate pivoted thereto above the plate for clamping material thereto, said body provided with a recess in its lower side intermediate its ends and having a pair of upper and lower spaced lugs extending from opposite ends thereof, upper and lower links having inner ends in spaced relation between and against said pair of lugs at opposite ends of said body, pivotal connections between inner ends of said links and lugs, a roll in the recess of the body and journalled therein having a portion of its periphery extending below the body for rolling along said intermediate portion of said rail, rolls between the link ends at the opposite ends of the body and rotatable on said pivotal connections for rolling along the forward vertical portion of the rail, and a flange extending rearwardly from the body for slidably engaging the rear portion of the rail, all adapted and arranged whereby said clip may be supported and guided for movement along said rail.

6. A tenter chain adapted to be guided for movement along a continuous rail having forward vertical, lower intermediate horizontal and rear horizontal longitudinal members comprising in combination, a plurality of separate and adjacent clip bodies each having a forward horizontal plate and a gate pivoted thereto above the plate for clamping material thereto and provided with a pair of spaced upper and lower lugs extending from opposite ends thereof, pairs of upper and lower links between adjacent bodies having opposite ends contiguous with upper and lower lugs of said bodies, pivotal connections between said lugs and link ends, said bodies provided with recesses in the lower sides thereof intermediate their ends and rolls rotatable therein having lower peripheral portions extending below the body for rolling along and supporting said bodies, rolls between the ends of the pairs of the links rotatable relative to said pivotal connections having outer peripheral portions for rolling along said forward rail member, and flanges extending rearwardly from said bodies having outer horizontal portions slidably engaging the underside of the rear rail member and shoulders slidably engaging an adjacent side of said rail member which is adjacent said bodies, all adapted and arranged whereby said chain forming clips may be rollably supported by said intermediate rail member and guided for movement longitudinally of a rail and held against sidewise tilting movements by said second-named rolls rolling on said forward rail member and said flanges and shoulders sliding along said rear rail member, the distance between the pivotal connections relative to the bodies being relatively greater than the distance between said connections relative to the links.

JOHN C. NASH.

REFERENCES CITED

The following references are of record in the file of this patent:

UNITED STATES PATENTS

| Number | Name | Date |
| --- | --- | --- |
| 139,038 | Bailey | May 20, 1873 |
| 820,746 | Taylor | May 15, 1906 |
| 1,984,377 | Krug | Dec. 18, 1934 |
| 2,097,960 | Williams | Nov. 2, 1937 |
| 2,285,820 | MacKnight | June 9, 1942 |

FOREIGN PATENTS

| Number | Country | Date |
| --- | --- | --- |
| 112,553 | Great Britain | Jan. 17, 1918 |